(12) United States Patent
Watanabe et al.

(10) Patent No.: US 6,475,365 B2
(45) Date of Patent: Nov. 5, 2002

(54) CAR BODY COATING PROCESS

(75) Inventors: Tadashi Watanabe, Hiratsuka (JP); Tadayoshi Hiraki, Odawara (JP); Akira Tominaga, Chigasaki (JP); Takeshi Yawata, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 91 days.

(21) Appl. No.: 09/770,209

(22) Filed: Jan. 29, 2001

(65) Prior Publication Data

US 2001/0012543 A1 Aug. 9, 2001

(30) Foreign Application Priority Data

Jan. 28, 2000 (JP) .................................. 2000-020065

(51) Int. Cl.$^7$ .............................................. C25D 13/00
(52) U.S. Cl. ....................... 204/488; 204/486; 204/505; 29/460
(58) Field of Search ................................. 204/488, 486, 204/505; 29/460

(56) References Cited

FOREIGN PATENT DOCUMENTS

EP    0 982 413 A2  *  3/2000

* cited by examiner

*Primary Examiner*—Kishor Mayekar
(74) *Attorney, Agent, or Firm*—Wenderoth, Lind & Ponack, L.L.P.

(57) ABSTRACT

This invention provides a car body coating process wherein the metal-exposed portion of a shell body, a part or whole of which has been made of plastics-covered metal plates, is electrocoated with use of an electrodeposition paint which contains no coloring pigment and has a bath solid content of at most 10% by weight and which is capable of forming a clear coating film.

18 Claims, No Drawings

CAR BODY COATING PROCESS

BACKGROUND OF THE INVENTION

The present invention relates to a car body coating process wherein the metal-exposed portion of shell body of a car body, a part or whole of which has been made of plastics-covered metal plates, is electrocoated with use of an electrodeposition paint which contains no coloring pigment and has a bath solid content of at most 10% by weight and which is capable of forming a clear coating film.

In the body of passenger car or of small passenger car, the portion which is mainly constituted of sheet metal and which is free of riggings such as engine or wheels is called shell body. Shell body is usually constituted of a main body, which consists of underbody, side member, roof, cowl, upper back, lower back, etc., and outer cover parts such as hood, front balance, front fender, cowl louver, door, luggage (back door), etc.

Up to the present, metal plates which have been cut and molded in the size and shape of each component part have been assembled to form main body and outer cover parts, which in turn are combined to make a shell body, which is dipped into a cationic electrodeposition paint bath so that the surface, backside, edge surface portion, etc., of the metal plates may be electrocoated, and, thus, the shell body is coated with a primer film.

Usually, after conducting this electrodeposition, water-washing is carried out several times with use of ultrafiltration filtrate, deionized water, tap water, etc., so as to remove superfluous electropaint which has adhered to the electrocoated surface or electropaint which has collected in the interior of bag-like portion. Then, heating is conducted so that thus formed coating film may be cured. Outside portions of shell body are coated with intermediate paint and topcoat paint.

In car body coating, however, cutting down of effluent from the process of water-washing of electrocoating film has recently been strongly desired for the sake of step saving, energy saving and $CO_2$ reduction in the coating line, and for the preservation of environment. Moreover, there has further been desired improvement not only in throwing power of electrodeposition paint to edge surface portion, but also in chipping resistance, corrosion resistance, etc., of total coating film including intermediate coating and top coating.

In the coating of a car body, on the other hand, there is proposed an inverse method (for example, Japanese Pre-grant Patent Publication No. 41317/1980), in which a substrate is powder-coated and the resulting coating film is cured, and, thereafter, the uncoated portion is electrocoated, for the purpose of the reduction of organic solvent discharged and the improvement of edge surface coatability of electrodeposition paint. This method has, however, such problems that powder coating facilities need to be newly provided, and that the corrosion resistance of the boundary portion between powder coating film and electrodeposition coating film is not sufficient.

The chief objective of the present invention is to provide a car body coating method which satisfies the above-mentioned requirements in car body coating and which ls free of the above-mentioned defects.

BRIEF SUMMARY OF THE INVENTION

As a result of assiduous study, the inventors of this invention have found that the above-mentioned objective can be attained by making a part or whole of shell body by using previously prepared metal plates covered with plastics layer, and then electrocoating the metal exposed portion of thus made shell body with an electrodeposition paint which contains no coloring pigment and has a bath solid content of at most 10% by weight and which is capable of forming a clear coating film, and, thus, have completed this invention.

Thus, according to the present invention, there is provided a car body coating process (hereinafter referred to as Process I) which is characterized in that main outer parts of a car body is made of plastics-covered metal plates to form a shell body, and that the metal exposed portion of the shell body is electrocoated with an electrodeposition paint which contains no coloring pigment and has a bath solid content of at most 10% by Weight and which is capable of forming a clear coating film.

According to the present invention, there is also provided a car body coating process (hereinafter referred to as Process II) which is characterized in that car parts which have been made by cutting, molding and joining plastics-covered metal plates are attached to the main outer portions of main body of a car body which has previously been assembled, and that the metal exposed portion of thus formed shell body is electrocoated with an electrodeposition paint which contains no coloring pigment and has a bath solid content of at most 10% by weight and which is capable of forming a clear coating film.

The car body coating processes of the present invention are described in more detail in the following.

DETAILED DESCRIPTION OF THE INVENTION

The processes of the present invention can be applied mainly to normal and small passenger car, but can also be applied to truck, bus, motorcycle, and specially equipped vehicles in the same manner.

As a metal plate to be covered with plastics, metals which have heretofore been used for car body can be similarly used. As the material of metal, there may be mentioned, for example, iron, steel, stainless steel, aluminium, copper, and alloys containing these metals, and, furthermore, plate of these metals whose surface is plated with zinc, zinc/nickel, iron, etc. For use, they can be processed into coils or cut plates. The thickness of these metal plates is suitably in the range of 0.3 to 2.0 mm, particularly 0.5 to 1.0 mm. The surface of these metal plates is preferably subjected to suitable treatment such as grinding treatment, degreasing treatment or phosphate treatment with a view to improvement in adhesivity with plastics layer, corrosion resistance, etc.

As plastic materials to cover the above-mentioned metal plates, there can be used known thermoplastic resins, for example, polyolefin resin such as polyethylene and polypropylene; polyester resin such as polyethylene terephthal ate (PET); polycarbonate resin; epoxy resin; vinyl acetate resin; vinyl chloride resin; fluorine-containing resin; polyvinyl acetal resin; polyvinyl alcohol resin; polyamide resin; polystyrene resin; acrylic resin; polyurethane resin; phenolic resin; polyether resin; cellulose type resin; etc. These plastic materials may contain color pigment, extender pigment, etc.

Covering of a metal plate with these plastics materials can be performed by known methods, which include sticking, onto metal plate, film- or sheet-like plastics formed by such a method as extrusion molding, injection molding, calender molding or compression molding; sticking with pressure, onto metal plate, molten plastics extruded into film or sheet;

adhering plastics in powder form onto metal plate by methods such as fluidized immersion, electrostatic coating, etc. and then melting by heating. Particularly preferable is the process of sticking plastics in film er sheet form onto metal plate. Covering of a metal plate with plastics is performed at least on the surface of a metal plate located at outer side of a car body. However, it is possible to cover both surfaces, if desired. The thickness of the plastics layer covering a metal plate is preferably in the range of usually 1 to 100 $\mu$m, particularly 3 to 75 $\mu$m, more desirably 5 to 50 $\mu$m. Moreover, it is possible to treat the surface of these plastics by corona discharge, plasma, flame, etc., before or after the covering onto the metal plate.

When a metal plate is to be covered with plastics by means of sticking film-like or sheet-like plastics onto the metal plate, it is preferable to previously apply an adhesive to the metal plate and/or to plastics film or sheet in order to increase adhesivity between the two. As such an adhesive there may be mentioned thermosetting or thermoplastic adhesives containing one or more kinds of resins selected from, for example, bisphenol type epoxy resin, resol type epoxy resin, acrylic resin, aminoplast resin, polyester resin, polysiloxane resin, etc., and optionally further containing a curing agent. Further, there can preferably be used as adhesive triazinethiol type compounds such as 2,4,6-trimercapto-S-triazine, 2-dibutylamino-4,6-dimercapto-S-triazine, 2,4,6-trimercapto-S-triazine-monosodium salt, 2,4,6-trimercapto-S-triazine-trisodium salt, etc.

In the Process I according to the present invention, plastics-covered metal plates which are prepared by the above-mentioned manner are cut, molded or jointed to assemble a shell body with. Specifically, from the plastics-covered metal plates, there are produced main body and outer cover parts, which are then assembled to form a shell body.

Shell body is such a portion in a car body as is constituted mainly of sheet metal and is free from riggings such as engine or wheels. Its main body is constituted mainly with parts such as underbody, side member, roof, cowl, upper back, lower back etc. and the outer cover parts consists mainly of parts such as hood, front balance, front fender, cowl louver, door, luggage (back door), etc. Parts of outer cover parts are called car parts.

Underbody here means the floor portion of the cabin, trunk room, etc., and is a generic term for front underbody, front floor, rear floor, etc. Side member forms the side of a cabin joining with a front body, roof panel, underbody, etc., and prevents the car from bending and/or twisting. Cowl is a panel combining left, right, front and rear pillars. Upper back is a panel combining left and right quarter panels (rear fender) at the back portion of a car body and forming outer surface of the car body.

In the Process I of the present invention, in order to form the above-mentioned parts constituting a shell body, a plastics-covered metal plate, which has been prepared as mentioned above, is cut to the suitable shape and size, pressed and molded by a press etc., and, if necessary, joined by adhering with adhesive, welding, bolted etc. to prepare parts of the main body such as underbody, side member, roof, cowl, upper back, lower back, etc.; and parts (car parts) of outer cover parts such as hood, front balance, front fender, cowl louver, door, luggage, etc. These cutting, molding and joining can be performed by known methods. Then the parts of the main body thus formed by using a plastics-covered metal plate are assembled, and joined to form a main body, to which parts of outer cover parts (car parts) such as hood, front balance, front fender, cowl louver, door, luggage, etc. are attached.

While at least the outer surface of the shell body which has thus been assembled with using plastics-covered metal plates is covered with a plastics layer, at least the edge surface portion of cut plastics-covered metal plates has its metal portion exposed. Moreover, the back side is preferably covered with plastics layer although metal portion may be exposed. In the Process I of the present invention, these exposed metal portions are: subsequently coated by electrodeposition.

In Process II according to the present invention, on the other hand, parts of outer cover parts (car parts) such as hood, front balance, front fender, cowl louver, door, luggage, etc. are made by cutting, molding and joining plastics-covered metal plates which have been prepared in the above-mentioned manner, and, then, these car parts are attached to the previously assembled main body of a car body, and, thus, a shell body is formed. Each part outer cover parts (car parts) which are made of plastics-covered metal plates may have the same structure as in the above-mentioned Process I.

In Process II of the present invention, most or the whole of the car parts, which constitute outer cover parts, are prepared by using the above-mentioned plastics-covered metal plate. For example, in order to form each part constituting outer cover parts such as hood, front balance, front fender, cowl louver, door, luggage (back door), etc., a plastics-covered metal plate is cut to the suitable shape and size, pressed and molded by a press etc., and, if necessary, joined by adhering with adhesive, welding, bolting etc. to prepare parts (car parts) such as hood, front balance, etc. These cutting, molding and joining can be performed by known methods. At least the outer surface of thus formed outer cover parts (car parts) is covered with a plastics layer, while the edge surface portion of a cut steel plate has an exposed metal portion. The back side may be uncovered and have exposed metal, or may be covered with plastics.

In Process II of the present invention, the main body constituted by underbody, side member, roof, cowl, upper back, lower back, etc., to which these car parts are attached, are prepared usually without using a plastics-covered metal plate. Instead, an uncovered metal plate is cut, molded and processed, and joined by known methods to form main body. A shell body is formed by attaching outer cover parts (car parts) which has been prepared from plastics-covered metal plate to a main body which has been prepared from such an uncovered metal plate. In Process II of the present invention, the whole surface of the main body and the exposed metal portion of outer cover parts (car parts) in thus assembled shell body are coated by electrodeposition.

In Processes I and II of the present invention, metal exposed portions of the assembled shell body is electrocoated with an electrodeposition paint which contains no coloring pigment, has a bath solid content of at most 10% by weight and which is capable of forming a clear coating film. The use of such a specific electrodeposition paint makes it possible to cut down effluent from water-washing process by which to remove superfluous electropaint which has adhered to electrocoated surface.

In detail, the use of electropaint which contains no coloring pigment and is capable of forming a clear coating film produces the following effects:

1) Thermal fluidity of coating film improves with the result that it becomes possible to form a coating film which is excellent in smoothness and corrosion resistance even though thin. Based on this merit, it becomes possible to shorten the current application time.

2) Although electropaint which has permeated into joint portions of coated article spouts out in baking process and adheres to other portions, it causes no popping owing to good thermal fluidity, and, thus, it is possible to simplify a process of water-washing permeated portions.

3) Even though electrodeposition paint adheres to plastic-covered surfaces, there occur no uneven drying nor secondary sag since formed coating film is clear, and, thus, appearance is not damaged.

4) In electrocoating bath, pigment or the like does not deposit at horizontal portions of article to be coated, and, thus, water-washing process can be simplified.

When there is used an electrodeposition paint which has a bath solid content of at most 10% by weight, uneven drying hardly occurs even though unelectrodeposited material remains on the coated surface after water washing, and, thus, decrease of appearance can be inhibited. Moreover, although electropaint which has permeated into joint portions spouts out during baking, it hardly causes sag or popping.

In order to remove unelectrodeposited material which has adhered electrocoated surfaces, there have usually been employed, in combination, primary water-washing with use of a filtrate which has been prepared by UF (ultrafiltration) of a part of electropaint in electrobath, and secondary water-washing with use of pure water. In particular, water after secondary water-washing is usually discharged outside after suitable waste disposal treatment. The amount of this waste water is said to be 5 to 10 tons per hour. Owing to the abovementioned effects produced by Processes I and II of this invention, it becomes possible to omit said secondary water-washing, which shortens water-washing process, and is preferable both in view of environment preservation and economy.

Incidentally, when the solid content of electrodeposition paint at the time of application exceeds 10% by weight, both the paint which has penetrated into, and collected at, joint portions in mold-processed plastics-covered metal plates and the non-electrodeposited paint which has adhered both to the surface of plastics-covered metal plates and to the surface of electrodeposition coating which has deposited on the metal-exposed portion come to have such a high concentration of solid contents that the above-mentioned primary water-washing becomes insufficient to fully remove said non-electrodeposited paint, with the result that the appearance is undesirably damaged.

There is no particular restriction on the electrodeposition paints to be used in Processes I and II of the present invention, and both anionic and cationic type ones will do so long as the electrodeposition paints satisfy the condition that they contain no coloring pigment and desirably no extender pigment, and that they have a bath solid content of at most 10% by weight, preferably 2 to 7% by weight, further desirably 3 to 5% by weight, and, moreover, that the electro-deposition paints are capable of forming a clear coating film. Especially preferable is a cationic type electrodeposition paint which is capable of forming a coating film with excellent corrosion resistance.

As a cationic electrodeposition paint, there can be mentioned an electrodeposition paint which is prepared by mixing and dispersing, in aqueous medium, a base resin (a) having hydroxyl group(s) and cationizable group(s), and a blocked polyisocyanate compound (b), and, as circumstances might demand, gelatinizing polymer particles as well.

As a base resin (a) having hydroxyl group(s) and cationizable group(s), the following can be mentioned.

1) reaction product of epoxy resin and cationizing agent; 2) acid-protonized product of polycondensate of polycarboxylic acid and polyamine (cf. U.S. Pat. No. 2,450,940 Specification); 3) acid-protonized product of polyadduct of polyisocyanate compound, polyol and mono- or polyamine; 4) acid-protonized product of copolymer of acryl type or vinyl type monomers having hydroxyl group and amino group [cf Japanese Laid-Open Patent Publications No. 12395/1970 (=U.S. Pat. No. 3,455,806) and No. 12396/1970 (=U.S. Pat. No. 3,454,482)]; 5) acid-protonized product polyadduct of polycarboxylic acid resin and alkyleneimine (cf. U.S. Pat. No. 3,403,088 Specification).

Preferable among the above is a resin included in reaction products of the above 1) which is obtained by further making a cationizing agent react with epoxy resin which has been prepared by reaction between polyphenol compound and epichlorohydrin, since said resin forms a coating film which is excellent in corrosion resistance.

Particularly suitable one among the above-mentioned epoxy resins has at least two epoxy groups in the molecule, a number average molecular weight of at least 200, preferably 800 to 2000, and an epoxy equivalent in the range of 190 to 2000, preferably 400 to 1000. Such epoxy resins include polyglycidyl ether of polyphenol compound. As said polyphenol compound there can be mentioned, for example, bis(4-hydroxyphenyl)-2,2-propane, 4,4'-dihydroxybenzophenone, bis(4-hydroxyphenyl)- 1,1-ethane, bis(4-hydroxyphenyl)- 1,1-isobutane, bis(4-hydroxy-tert-butylphenyl)-2,2-propane, bis(2-hydroxybutyl)methane, 1,5-dihydroxynaphthalene, bis(2,4-dihydroxy-phenyl)methane, tetra(4-hydroxyphenyl)-1,1,2,2-ethane, 4,4'-dihydroxydiphenyl ether, 4,4'-dihydroxydiphenyl sulfone, phenol novolac, cresol novolac, etc.

These epoxy resins may be further modified by subjecting to reaction with polyol, polyehter polyol, polyester polyol, polyamidoamine, polycarboxylic acid, polyisocyanate compound, etc., and further may be graft-polymerized by ε-caprolactone, acrylic monomer, etc.

Cationizing agent in the above-mentioned 1) is made to react with most or whole of the epoxy groups existing in the epoxy resin, by which to introduce cationizable group such as secondary amino group, tertiary amino group, quaternary ammonium base, etc. into the resin, and, thus, there is given a base resin (a) having a hydroxyl group(s) and a cationazable group(s) by reacting.

As such a cationazing agent, there can be mentioned amine compound, for example, primary amine, secondary amine, tertiary amine, polyamine, etc. Here, there can be mentioned as a primary amine compound, for example, methylamine, ethylamine, n-propylamine, isopropylamine, monoethanolamine, n-propanolamine, isopropanolamine, etc.; as a secondary amine compound, for example, diethylamine, diethanolamine, di-n-propanolamine, diisopropanolamine, N-methylethanolamine, N-ethylethanolamine, etc.; and as a tertiary amine compound, for example, triethylamine, triethanolamine, N,N-dimethylethanolamine, N-methyldiethanolamine, N,N-diethylethanolamine, N-ethyldiethanolamine, etc. As a polyamine there can be mentioned, for example, ethylenediamine, diethylenetriamine, hydroxyethylaminoethylamine, ethylaminoethylamine, methylaminopropylamine, dimethylaminoethylamine, dimethylaminopropylamine, etc.

As a hydroxyl group in the base resin (a), there may be mentioned a primary hydroxyl group which is introduced by, for example, a reaction with an alkanol amine in the abovementioned cationizing agent, or by a ring-opening reaction with caprolactone which may be introduced in the epoxy resin, or by a reaction with a polyol, etc.; a secondary hydroxyl group in the epoxy resin etc. Among these, a primary hydroxyl group introduced by a reaction with an alkanolamine is preferable due to its excellent crosslinking reactivity with a blocked polyisocyanate compound (crosslinking agent). The amount of hydroxyl groups in the base resin (a) is preferably in the range of generally 20 to 5000 mgKOH/g, particularly 100 to 1000 mgKOH/g. Particularly, it is preferable that the primary hydroxyl group equivalent be in the range of 200 to 1000 mgKOH/g. The amount of a cationizable group is preferably at least the minimum limit which is necessary for the dispersion of the base resin (a) in water, preferably in the range of 3 to 200, particularly 5 to 150, and especially 10 to 80, calculated as KOH (mg/g solid content) (amine value).

It is desirable that the base resin (a) does not substantially contain a free epoxy group.

Blocked polyisocyanate compound (b) as a crosslinking agent is a compound in which substantially all isocyanate groups in the polyisocyanate compound are blocked by a volatile blocking agent. When heated over the predetermined temperature (usually 100 to 200° C., the blocking agent is dissociated to regenerate an isocyanate group which takes part in the crosslinking reaction with hydroxyl group of the base resin (a).

Polyisocyanate compound is a compound having at least two isocyanate groups in the molecule, examples of which include aliphatic diisocyanate such as hexamethylene diisocyanate, trimethylene diisocyanate, tetramethylene diisocyanate, dimer acid diisocyanate, lysine diisocyanate, etc.; alicyclic diisocyanate such as isophorone diisocyanate, methylenebis(cyclohexylisocyanate), methylcyclohexane diisocyanate, cyclohexane diisocyanate, cyclopentane diisocyanate, etc.; aromatic diisocyanate such as xylylene diisocyanate, tolylene diisocyanate, diphenylmethane diisocyanate, naphthalene diisocyanate, toluidine diisocyanate, etc.; urethanation adducts, biuret type adducts, isocyanuric ring type adducts of these polyisocyanate compounds, etc.

As a blocking agent to block a free isocyanate group of these polyisocyanate compounds, there can be used known blocking agents of phenol type, alcohol type, active methylene type, mercaptan type, acid amide type, imide type, amine type, imidazole type, urea type, carbamic acid type, imine type, oxime type, sulfurous acid type, lactam type, etc.

As for the constitutional proportion of the base resin (a) and the blocked polyisocyanate compound (b), the former preferably accounts for 40 to 90%, particularly 50 to 80%, and the latter accounts for 60 to 10%, particularly 50 to 20%, each based upon the total solid content weight of both components (a) and (b).

A cationic electrodeposition paint which is usable in Processes I and II of this invention contains no coloring pigment and desirably no extender pigment, and can be prepared, for example, by neutralizing the cationizable group in a base resin (a) with an acid compound such as acetic acid, formic acid, lactic acid, phosphoric acid, etc., and then mixing and dispersing in water together with a blocked polyisocyanate compound (b) as a crosslinking agent. The pH at the time of its electrocoating is suitably in the range of generally 3–9, particularly 5–7.

To a cationic electrodeposition paint, with a view to improvement in corrosion resistance and curability of electrocoating film, there can be suitably blended, as circumstances might demand, organic acid salt or inorganic acid salt of a metal selected from aluminium, nickel, zinc, zirconium, molybdenum, tin, antimony, lanthanum, tungsten, bismuth, etc., in an amount of 0.1 to 10 parts by weight, particularly 0.5 to 5 parts by weight, per 100 parts by weight of total solid contents of base resin (a) and blocked polyisocyanate compound (b).

Cationic electrodeposition paint may further contain gelatinizing polymer particles, which give rise to effects that excessive thermal fluidity can be inhibited, resulting in improved corrosion resistance (edge covering property) of edge surface portion of metal exposed portions.

Gelatinizing polymer particles are prepared by three dimensionally crosslink-polymerizing polymerizable monomers. There are suitably usable known ones such as those which are disclosed in Japanese Patent KOKAI Publication No. Hei 2 (1990)-47173 (=U.S. Pat. No. 5,021,530) and Japanese Patent KOKAI Publication No. Hei 2 (1990)-64169. Concretely, there can be mentioned gelatinizing polymer which is produced by emulsion-polymerizing monomer (1) which has both polymerizable double bond and hydrolyzable alkoxysilane group, monomer (2) which has at least two polymerizable double bonds in a molecule, monomer (3) which has both polymerizable double bond and hydroxyl group and another monomer (4) which has polymerizable double bond, in the presence of cationically reactive emulsifier which has allyl group in its molecule.

Monomer (1) is a compound which has at least one polymerizable double bond and at least one hydrolyzable alkoxysilane group in a molecule. Examples of monomer (1) include vinyltrimethoxysilane, vinyltriethoxysilane, vinyltris(2-methoxyethoxy)silane, γ-methacryloxypropyltrimethoxysilane and vinyltriacetoxysilane, among which γ-methacryloxypropyltrimethoxysilane is suitable.

Monomer (2) is a compound which has at least two polymerizable double bonds in a molecule. Examples of monomer (2) include polymerizable unsaturated monocarboxylic acid ester of polyhydric alcohol, polymerizable unsaturated alcohol ester of polybasic acid and aromatic compound which is substituted by at least two vinyl groups. Concretely, there can be mentioned ethyleneglycol di(meth) acrylate; 1,6-hexanediol di(meth)acrylate; diallylphthalate; and divinylbenzene.

Monomer (3) is a compound which has at least one polymerizable double bond and at least one hydroxyl group in a molecule, and which introduces hydroxyl group into gelatinizing polymer particles, imparts hydrophilicity to said particles and functions as crosslinking functional group between particles. Concretely, preferable examples include 2-hydroxy(meth)acrylate and hydroxypropyl-(meth) acrylate.

Monomer (4) is a compound which has polymerizable double bond other than the above-mentioned monomers (1) to (3). Examples include alkyl (having 1 to 20 carbon atoms) ester of acrylic or methacrylic acid such as methyl(meth) acrylate, ethyl(meth)acrylate, propyl(meth)acrylate, hexyl (meth)acrylate, lauryl(meth)acrylate and cyclohexyl(meth) acrylate; vinylaromatic monomer such as styrene, α-methylstyrene and vinyltoluene; amides of acrylic or methacrylic acid; and (meth)acrylonitrile.

Constitutional proportion of these monomers is not in particular restricted, and can be selected optionally according to objective. Preferably, however, monomer (1) is in a range of 1 to 30% by weight, in particular 3 to 20% by weight; monomer (2) is in a range of 1 to 30% by weight, in particular 3 to 20% by weight; monomer (3) is in a range of 1 to 30% by weight, in particular 3 to 20% by weight; and monomer (4) is in a range of 10 to 97% by weight, in particular 40 to 91% by weight; on the basis of the weight of total solid contents of these monomers.

As an example of cationically reactive emulsifier which has allyl group in its molecule, there. can be mentioned a reactive emulsifier having quaternary ammonium salt which has the following formula:

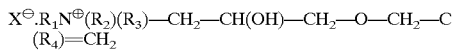

wherein $R_1$ denotes a hydrocarbon having 8 to 22 carbon atoms which may be substituted; $R_2$ and $R_3$ each denote an alkyl group having 1 to 3 carbon atoms; $R_4$ denotes a hydrogen atom or a methyl group; and $X^\ominus$ denotes a monovalent anion.

As said cationically reactive emulsifier, there can be used one which has already been known [from, for instance, Japanese KOKAI Patent Publication No. Sho 60 (1985)-78947], such as "Ratemuru K-180" (trade name; Kao Corporation) which has been put on the market. Such an emulsifier is used in an amount of 0.1 to 30 parts by weight, in particular 0.5 to 5 parts by weight per 100 parts by weight of solid content of gelatinizing polymer particles.

The polymerization reaction of the above-mentioned monomers is conducted by emulsion polymerization which is known as a method for the production of acrylic polymer. Concretely, a mixture of monomers is subjected to reaction in an aqueous medium in the presence of the above-mentioned emulsifier and a polymerization initiator such as water-soluble azoamide compound, usually at a reaction temperature of about 50 to about 100° C. for about 1 to about 20 hours. Aqueous dispersion of thus obtained gelatinizing polymer particles have usually a resin solid content of 10 to 40% by weight. Said particles have a particle size of at most 500 nm, in particular 10 to 300 nm, and most desirably 50 to 100 nm. Particle size can easily be adjusted by varying the amount of the above-mentioned emulsifier. The amount of gelatinizing polymer particles blended is preferably within the range of 1 to 20 parts by weight, in particular 5 to 15 parts by weight, per 100 parts by weight of total solid content of base resin (a) and blocked polyisocyanate compound (b) in the cationic electrodeposition paint.

When applied, the cationic electrodeposition paint is adjusted so that it may have a pH of 3 to 9, preferably 5 to 7, and may have a solid content of at most 10% by weight, preferably 2 to 7% by weight, most desirably 3 to 5% by weight, and a bath temperature within a range of 25 to 35° C. In the bath of said electrodeposition paint, there is dipped a shell body of a car which is produced with use of plastics-covered metal plates prepared by Processes I and II. Then, by means of current application, metal exposed portions such as edge surface portions of the shell body is coated with electrodeoposition coating film. As for current application condition, voltage is preferably 100 to 400 V, and current application time is preferably 1 to 10 minutes. When electrodeposition is conducted in this manner, an electrodeposition coating film is formed on metal exposed portions such as edge surface portion which appears by the cutting of plastics-covered metal plate and the backside or right side portion of said metal plate which is free of plastics cover. The thickness of an electrodeposition coating film is preferably in the range of about 5 to about 40 $\mu$m, particularly 10 to 20 $\mu$m, as a cured film, on flat.

After the electrocoating is over, the article to be coated (shell body) is drawn up from the electrobath, and, is then preferably washed with water so that undeposited electropaint which has adhered to electrocoated surface or electropaint which has collected in the interior or bottom of bag-like portions may be removed.

Electrocoating film after the electrodeposition may be washed only with a filtrate which has been prepared by ultrafiltration of a part of electropaint which had been taken from electrobath. Otherwise, said electrocoaint film may be first washed with said filtrate, and then with water (e.g., pure water) which is supplied to keep the liquid surface of electrobath constant. Water which has been used for these water washing processes is recovered into electrobath, and, therefore, effluent is not drained outside, which manner is to be called closed system. Or, otherwise, electrocoating film after the electrodeposition may be subjected to water washing in such a manner that the amount of drainage of washing water may fall within the range of at most 500 ml, preferably at most 300 ml, per square meter of electrocoated area (in which-case, drain disposal is carried out by open system). Or again, these water washing processes may be dispensed with with.

After water washing, electrocoated film can be cured by heating at a temperature of about 100 to about 200° C., preferably about 120 to about 180° C., for about 10 to 40 minutes.

Through the aforementioned Processes I and II of the present invention, the following effects can be achieved.
(1) Since the electrodeposition paint deposits easily at the boundary portion between the plastics covering film and exposed metal, the corrosion resistance of this portion improves remarkably.
(2) Since metal plates which have previously been covered with plastics are used for the production not only of outer cover parts such as hood panel, fender panel, door panel, luggage door panel etc. of the car body, but also of main body consisting of underbody, side member, roof, cowl, upper back, lower back, etc., it is possible to largely reduce the amount of the electrodeposition paint to be used at the next step.
(3) Since at least the outer surface of outer cover parts is covered with a layer of plastics having a high volume specific resistance and, since, under circumstances, at least the outer surface of the main body is also covered with a layer of plastics having a high volume specific resistance, the area of the portion of shell body to be coated by electrodeposition (portion with exposed metal) is small, and, consequently, the throwing power of the paint increases, and particularly the corrosion resistance of the edge surface portion is improved.
(4) It is possible to give the properties, which the covering plastics have, such as chipping resistance, corrosion resistance etc., to a car body.
(5) The use of electropaint which contains no coloring pigment and is capable of forming a clear coating film produces the following effects:
1) Thermal fluidity of coating film improves with the result that it becomes possible to form a coating film which is excellent in smoothness and corrosion resistance even though thin. Based on this merit, it becomes possible to shorten the current application time.
2) Although electropaint which has permeated into joint portions of coated article spouts out in baking process and adheres to other portions, it causes no popping owing to good thermal fluidity, and, thus, it is possible to shorten a process of water-washing permeated portions.
3) Even though electrodeposition paint adheres to plastic-covered surfaces, there occur no uneven drying nor secondary sag marks since formed coating film is clear, and, thus, appearance is not damaged.

4) In electrocoating bath, pigment or the like does not deposit at horizontal portions of article to be coated, and, thus, water-washing process can be simplified.

(6) When there is used an electrodeposition paint which has a bath solid content of at most 10% by weight, uneven drying hardly occurs even though unelectrodeposited material remains on the coated surface after water washing, and, thus, decrease of appearance can be inhibited. Moreover, although electropaint which has permeated into joint portions spouts out during baking, it hardly causes sag or popping.

(7) Owing to the use of such an electropaint, undeposited material which has adhered to the elctrocoated surface needs no water-washing for removal, or, even though it istobewater-washed,primarywaterwashingissufficient, with the result that water washing process is shortened, which is preferable in view of the preservation of environment and economy.

The present invention will be described more specifically by Examples and Comparative Examples. Parts and % are by weight and the film thickness is that of the cured film.

1. Preparation of Plastics-covered Metal Plate (a) Both sides of a polyester film with a film thickness of 16 μm were treated by corona discharge, and, then, one side was coated with a thermocurable polyester resin type adhesive to a film thickness of 7 μm, which was dried by heating at 120° C. for 30 seconds, and wound up. Next, both sides of a cold rolled steel plate of 0.8 mm thickness were plated with alloyed molten zinc so that the plated amount may be 45 g/m², and, then, were degreased and chemically treated with zinc phosphate ("PB#3080 Treatment"; tradename of a product of Nihon Parkerrizing Co., Ltd.). One side of this metal plate was covered with the above-mentioned polyester film by adhering with heat and pressure through the intermediary of adhesive, and, thus, plastics-covered metal plate was obtained.

EXAMPLES AND COMPARATIVE EXAMPLES

Example 1

An (about ⅕₂₅ scale) model of a main body consisting of underbody, side member, roof, cowl, upper back and lower back was previously prepared by cutting, molding and joining the plastics-covered metal plate (a). Furthermore (about ⅕₂₅ scale) models of outer cover parts (car parts) such as hood, fender, door, luggage door, etc. were prepared by cutting, molding and joining the plastics-covered metal plate (a).

Subsequently, outer cover parts were attached to the main body to form a shell body, which was then dipped into a cationic electrodeposition paint bath (NOTE 1), and, thus, metal exposed portions of the shell body were electrocoated under the conditions of bath temperature of 28° C., voltage of 200 V, and totally dipped current passing time of 2 minutes. Then, the shell body was inclined up and down twice in the lengthwise directioln at an angle of about 30 degrees so that sagging electropaint might be drained off. Next, the shell body was washed with mist spray of an filtrate which had been prepared by ultrafiltration of a part of electrodeposition paint bath (NOTE 1), and, thereafter, was set for five minutes with an inclination of about 30 degrees, and, then, the electrodeposition coating film was heated at 170° C. for 30 minutes to be cured. The thickness of the flat portion of the electrodeposition coating film was 20 μm.

(NOTE 1) Cationic electrodeposition paint bath:

There were blended 70 parts (solid content) of amine added polyamide modified epoxy resin, 30 parts (solid content) of blocked polyisocyanate compound (4,4-diphenylmethane diisocyanate blocked with 2-ethylhexylalcohol) and 1 part of dibutyltin laurate. The resultant mixture was neutralized with 15 parts of 10% acetic acid. Then, the solid content of this mixture was adjusted to 5% with use of deionized water.

Example 2

A shell body similar to the one mentioned in Example 1 was dipped into a cationic electrodeposition paint bath (NOTE 2), and, thus, metal exposed portions of the shell body were electrocoated under the conditions of bath temperature of 28° C., voltage of 200 V, and totally dipped current passing time of 2 minutes. Then, the shell body was inclined up and down twice in the lengthwise direction at an angle of about 30 degrees so that sagging electropaint might be drained off. Next, without water washing, the electrodeposition coating film was heated at 170° C. for 30 minutes to be cured. The thickness of the flat portion of the electrodeposition coating film was 20 μm.

(NOTE 2) Cationic electrodeposition paint bath:

There were blended 70 parts (solid content) of amine added polyamide modified epoxy resin, 30 parts (solid content) of blocked polyisocyanate compound (4,4-diphenylmethane diisocyanate blocked with 2-ethylhxylalcohol) and 1 part of dibutyltil laurate. The resultant mixture was neutralized with 15 parts of 10% acetic acid. Then, the solid content of this mixture was adjusted to 3% with use of deionized water.

Example 3

An (about ⅕₂₅ scale) model of a main body consisting of underbody, side member, roof, cowl, upper back and lower back was previously prepared by cutting, molding and joining a metal plate plated with alloyed molten zinc whose both surfaces were uncovered. On the other hand, (about ⅕₂₅ scale) models of outer cover parts (car parts) such as hood, fender, door, luggage door, etc. were prepared by cutting, molding and joining the plastics-covered metal plate (a).

Subsequently, outer cover parts were attached to the main body to form a shell body, which was then dipped into a cationic electrodeposition paint bath (NOTE 1), and, thus, metal exposed portions of the shell body were electrocoated under the conditions of bath temperature of 28° C., voltage of 200 V, and totally dipped current passing time of 2 minutes. Then, the shell body was inclined up and down twice in the lengthwise direction at an angle of about 30 degrees so that sagging electropaint might be drained off. Next, the shell body was washed with mist spray of an filtrate which had been prepared by ultrafiltration of a part of electrodeposition paint bath (NOTE 1), and, thereafter, was set for five minutes with an inclination of about 30 degrees, and, then, the electrodeposition coating film was heated at 170° C. for 30 minutes to be cured. The thickness of the flat portion of the electrodeposition coating film was 20 μm.

Example 4

A shell body similar to the one mentioned in Example 1 was dipped into a cationic electrodeposition paint bath (NOTE 3), and, thus, metal exposed portions of the shell body were electrocoated under the conditions of bath temperature of 28° C., voltage of 200 V, and totally dipped current passing time of 2 minutes. Then, the shell body was inclined up and down twice in the lengthwise direction at an angle of about 30 degrees so that sagging electropaint might be drained off. Next, the shell body was washed with mist spray of an filtrate which had been prepared by ultrafiltration of a part of electrodeposition paint bath (NOTE 3), and, thereafter, was set for five minutes with an inclination of about 30 degrees, and, then, the electrodeposition coating film was heated 170° C. for 30 minutes to be cured. The thickness of the flat portion of the electrodeposition coating film was 20 μm.

(NOTE 3) Cationic electrodeposition paint bath:

There were blended 70 parts (solid content) of amine added polyamide modified epoxy resin, 30 parts (solid content) of blocked polyisocyanate compound (4,4-diphenylmethane diisocyanate blocked with 2-ethylhexylalcohol), 10 parts (solid content) of gelatinizing resin fine particles and 1 part of dibutyltin laurate. The resultant mixture was neutralized with 15 parts of 10% acetic acid. Then, the solid content of this mixture was adjusted to 5% with use of deionized water.

Example 5

A shell body similar to the one mentioned in Example 1 was dipped into a cationic electrodeposition paint bath (NOTE 3), and, thus, metal exposed portions of the shell body were electrocoated under the conditions of bath temperature of 28° C., voltage of 200 V, and totally dipped current passing time of 2 minutes. Then, the shell body was inclined up and down twice in the lengthwise direction at an angle of about 30 degrees so that sagging electropaint might be drained off. Next, the shell body was washed with mist spray of an filtrate which had been prepared by ultrafiltration of a part of electrodeposition paint bath (NOTE 3), and further washed with mist of pure water for the adjustment of electrobath liquid surface, and, thereafter, was set for five minutes with an inclination of about 30 degrees, and, then, the electrodeposition coating film was heated at 170° C. for 30 minutes to be cured. The thickness of the flat portion of the electrodeposition coating film was 20 μm.

Comparative Example 1

A shell body similar to the one mentioned in Example 1 was dipped into a cationic electrodeposition paint bath which had been prepared by adjusting the solid content of the above-mentioned cationic electrodeposition paint bath (NOTE 1) to 15%, and, thus, metal exposed portions of the shell body were electrocoated under the conditions of bath temperature of 28° C., voltage of 200 V, and totally dipped current passing time of 2 minutes. Then, the shell body was inclined up and down twice in the lengthwise direction at an angle of about 30 degrees so that sagging electropaint might be drained off. Next, the shell body wasp washed with mist spray of an filtrate which had been prepared by ultrafiltration of a part of electrodeposition paint bath, and, then, the electrodeposition coating film was heated at 170° C. for 30 minutes to be cured. The thickness of the flat portion of the electrodeposition coating film was 20 μm.

Comparative Example 2

A shell body similar to the one mentioned in Example 1 was dipped into a cationic electrodeposition paint bath ("Elecron #9600", tradename of a product of Kansai Paint Co., Ltd; Gray color) having a solid content of 20%, and, thus, metal exposed portions of the shell body were electrocoated under the conditions of bath temperature of 28° C., voltage of 200 V, and totally dipped current passing time of 2 minutes. Then, the shell body was inclined up and down twice in the lengthwise direction at an angle of about 30 degrees so that sagging electropaint might be drained off. Next, the shell body was washed with mist spray of an filtrate which had been prepared by ultrafiltration of a part of electrodeposition paint bath ("Elecron #9600"), and, then, the electrodeposition coating film was heated at 170° C. for 30 minutes to be cured. The thickness of the flat portion of the electrodeposition coating film was 20 μm.

3. Performance Test Results

The electrocoating films which were formed in Examples and Comparative Examples were visually observed with respect to stains of uneven drying, marks of secondary sagging and of popping caused by electropaint which had spouted out from joints, and edge corrosion resistance. The results are shown in Table 1.

TABLE 1

|  | Examples | | | | | Comparative Examples | |
|---|---|---|---|---|---|---|---|
|  | 1 | 2 | 3 | 4 | 5 | 1 | 2 |
| Uneven drying | ○ | ○ | ○ | ○ | ○ | Δ | × |
| Marks of secondary sagging and of popping | Δ | Δ | Δ | Δ | ○ | × | × |
| Edge corrosion resistance | ○ | ○ | ○ | ◎ | ◎ | ○ | ◎ |

Test Methods

Uneven drying:

○ shows that there was observed no stain of uneven drying of adhered electropaint liquid; Δ shows that stains of uneven drying of adhered electropaint liquid was seen a bit; and x shows that stains of uneven drying of adhered electropaint liquid were seen remarkably all over.

Marks of secondary sagging and of popping:

○ shows that there was observed no marks of sagging and of popping caused by electropaint which had spouted out from joints, and that the appearance was good; Δ shows that marks of sagging (unevenness) and of popping were seen a bit, and that the appearance was no good; and x shows that marks of sagging (unevenness) and of popping were seen remarkably, and that the appearance was no good.

Edge corrosion resistance:

The models which had been electrocoated in Examples and Comparative Examples were placed in a salt spray resistance test machine (35° C.), and, after 240 hours the corrosion resistance at the acute angle edge of cut portion of plastics-covered steel plate of the shell body was observed.

◎ shows that no rust was observed at edge surface portion; ○ shows that the occurrence of rust was slightly seen at the edge surface portion; is observed at all, Δ shows that the occurrence of rust and blisters was observed a bit at the edge surface portion; and X shows that the occurrence of rust and blisters was remarkably seen at the edge surface portion.

What is claimed is:

1. A car body coating process wherein the main exterior of a car body is produced with use of plastics-covered metal plates to form a shell body, and that the metal-exposed portion of the shell body is electrocoated with an electrodeposition paint which contains no coloring pigment and has a bath solid content of at most 10% by weight and which forms a clear coating film.

2. A car body coating process wherein car parts which are made by cutting, holding and joining plastics-covered metal plates are attached to the main exterior of main body which has previously been assembled, and that thus formed shell body has its metal-exposed portions electrocoated with an electrodeposition paint which contains no coloring pigment and has a bath solid content of at most 10% by weight and which forms a clear coating film.

3. The process of claim 1 or claim 2 wherein the plastics-covered metal plate is prepared by sticking a film or sheet plastic onto a metal plate.

4. The process of claim 3 wherein the film or sheet plastic is stuck onto a metal plate via an adhesive.

5. The process of claim 1 or claim 2 wherein the thickness of plastic layer on the plastics-covered metal plate is in the range of 3 to 75 $\mu$m.

6. The process of claim 1 or claim 2 wherein the electrodeposition paint does not substantially contains extender pigment either.

7. The process of claim 1 or claim 2 wherein the electrodeposition paint has a bath solid content of 2 to 7% by weight.

8. The process of claim 1 or claim 2 wherein the electrodeposition paint has a bath solid content of 3 to 5% by weight.

9. The process of claim 1 or claim 2 wherein the electrodeposition paint is of cationic type.

10. The process of claim 9 wherein the electrodeposition paint comprises a base resin (a) having hydroxyl group(s) and cationizable group(s) and a blocked polyisocyanate compound (b) as a crosslinking agent, and of usually gelatinizing polymer particles as well.

11. The process of claim 10 wherein the base resin (a) is a resin which is obtained by further making a cationizing agent react with epoxy resin which has been prepared by reaction between polyphenol compound and epichlorohydrin.

12. The process of claim 10 wherein the proportion of base resin (a) is within a range of 40 to 90% on the basis of the weight of total solid contents of base resin (a) and blocked polyisocyanate compound (b).

13. The process of claim 10 wherein the proportion of gelatinizing polymer particles is within a range of 1 to 20 parts by weight per 100 parts by weight of total solid contents of base resin (a) and blocked polyisocyanate compound (b).

14. The process of claim 1 or claim 2 wherein the coating film which is formed by electrodeposition coating has a thickness in the range of 5 to 40 $\mu$m.

15. The process of claim 1 or claim 2 wherein electrocoating film after the electrodeposition is subjected to water washing in such a manner that the amount of drainage of washing water is at most 500 ml per square meter of electrocoated area.

16. The process of claim 15 wherein coating film after the electrodeposition is washed either with ultrafiltration filtrate alone or firstly with ultrafiltration filtrate and subsequently with pure water for the adjustment of electrobath liquid surface.

17. The process of claim 1 or claim 2 wherein the step of water washing of coating film after the electrodeposition is omitted.

18. The process of claim 1 or claim 2 wherein coating film after the electrodeposition is cured by heating at a temperature of about 100° C. to about 200° C.

* * * * *